United States Patent [19]

Warner et al.

[11] 4,280,497

[45] Jul. 28, 1981

[54] CONTAINER FOR PLATELET STORAGE

[75] Inventors: Willis L. Warner; Edward J. Nelson, both of San Rafael, Calif.

[73] Assignee: Cutter Laboratories, Inc., Berkeley, Calif.

[21] Appl. No.: 83,136

[22] Filed: Oct. 9, 1979

[51] Int. Cl.³ .............................................. A61J 1/00
[52] U.S. Cl. ................................ 128/272; 128/214 D
[58] Field of Search ............... 128/214, 272, DIG. 24, 128/213 A, 213 R

[56] References Cited

U.S. PATENT DOCUMENTS 3,940,802  3/1976  Sako et al. ........................... 128/272

FOREIGN PATENT DOCUMENTS 1210552  10/1970  United Kingdom .................... 128/272

Primary Examiner—Robert W. Michell
Assistant Examiner—Thomas Wallen
Attorney, Agent, or Firm—Robert E. Allen; James A. Giblin; Bertram Bradley

[57] ABSTRACT

A plastic bag containing a platelet concentrate is disclosed wherein the viability of platelets remains at a high level even after storage at 22° C. for up to five days. The bag in which the platelet concentrate is stored comprises walls of polyvinyl chloride film containing tri 2-ethylhexyl trimellitate as plasticizer together with epoxidized vegetable oils for heat stabilization of the film. The film may also contain metal soaps in preferred formulations.

5 Claims, 1 Drawing Figure

CONTAINER FOR PLATELET STORAGE

BACKGROUND OF THE INVENTION

This invention relates to an improvement in a polyvinyl chloride container for storing blood platelets.

There are a number of individuals whose blood is deficient in blood platelets and who therefore run the risk of serious complications should they require surgery or become injured since their blood will not clot properly. Such individuals require the intravenous administration of concentrates of blood platelets at the time of an injury or prior to surgery. Platelet concentrates are routinely obtained by well established procedures from blood plasma and are stored in medical grade polyvinyl chloride (PVC) bags either at around 4° C. or at about 22° C. prior to use.

Unfortunately the integrity of platelets is very short-lived when stored at 22° C. and morphologic changes develop wherein the normal discoid platelets are transformed into spherical cells which are non-functional. These latter forms expire and are eliminated from the circulation. By labelling platelets with $^{51}Cr$, one can determine the degree of survival (% recovery) of viable cells at different periods following injection of platelet concentrates.

Platelet concentrates contain glucose (dextrose) as a consequence of the process by which they are collected since the blood has been collected in bags containing buffered anticoagulants such as ACD (acid citrate-dextrose) or CPD (citrate-phosphate-dextrose). During storage, the platelets convert glucose to lactic acid and carbon dioxide ($CO_2$) which lower the pH. Murphy and Gardner (Blood, Vol. 46, No. 2, pp. 209–218, 1975) measured $CO_2$ and oxygen pressures in various PVC and polyethylene (PE) bags containing platelet concentrates and observed that the drop in pH was greater the thicker the walls of the bag. Since oxygen is known to suppress conversion of glucose to lactic acid, it was concluded that the efficiency of oxygen transport into and $CO_2$ transport from the bags was dependent upon the thickness of the bag walls. For a given platelet count, the pH drop of stored concentrates was significantly less for thin walled containers. Concentrates with high platelet counts ($2 \times 10^6/mm^3$ and greater) stored in standard PVC bags whose walls were considerably thicker had a pH of around 6.0 or lower after 3 days storage. Murphy and Gardner (Blood Vol. 35, pp. 549–557, 1970) have also shown that an abrupt loss of in vivo viability occurs if pH falls below 6.0 during storage.

Unfortunately, thicker-walled bags are necessary in the process of obtaining platelet concentrates since the bags are subjected to high speed centrifugation and must be resistant to rupturing. To achieve the degree of flexibility needed for standard PVC bags, the PVC contains a certain percentage of di-2-ethylhexyl phthalate (DEHP) plasticizer. Recently there has been increasing concern over the possibility of harmful effects derived from DEHP which leaches into biological products stored in standard PVC containers and which then is infused into patients. Although PE contains no plasticizers, it would not be a suitable material for bags in which to collect platelet concentrates any more than thin-walled PVC bags since they are highly susceptible to rupturing during pressure steam sterilization and/or centrifugation.

It would therefore be highly desirable to be able to store platelets in a plastic container having sufficient tensile strength to withstand pressure sterilization and high-speed configuration while at the same time having good carbon dioxide and oxygen permeability characteristics so as to prolong platelet survival. It would be a particular advantage if platelet survival could be prolonged beyond the usual three day survival period. Currently, blood banks must discard platelets after three days storage which makes it difficult and expensive to maintain supplies for emergency situations.

SUMMARY OF THE INVENTION

A plastic container has been found which withstands rupturing during pressure heat sterilization and high-speed centrifugation and which has superior characteristics for transmitting carbon dioxide and oxygen. Surprisingly, it has been found that platelets when stored in such a container maintain acceptable viability for a considerable period of time beyond three days, i.e., for at least five days or longer.

The container is preferably made in the shape of a bag whose walls are composed of PVC film plasticized with about 30 to about 50 weight percent of tri 2-ethylhexyl trimellitate (TOTM) preferably about 37 weight percent, and about 3 to 5, preferably about 3.5 weight percent of a heat stabilization system suitable for medical grade PVC plastics such as epoxidized vegetable oils. Typical of the latter are epoxidized soy bean oil and epoxidized linseed oil. Although not critical, the heat stabilization system preferably also includes small amounts, i.e., less than one percent, preferably about 0.60 percent, of a metal soap such as zinc stearate, calcium stearate or the like. Very small amounts of a lubricant such as mineral oil may be included, i.e., less than 0.5 percent.

The wall thickness of the container may be in the range of 0.010 to 0.020 inch, preferably about 0.012 to 0.016 inch, with 0.015 inch being most preferred, to provide containers having sufficient tensile strength to withstand high pressures generated in their use. Film sheets with which to make bags are obtained by methods well established in the industry. The bag contains an acceptable level of blood platelets in a concentrate according to the requirements of The American Association of Blood Banks, that is, there should be at least $5.5 \times 10^{10}$ viable platelets in about 30–50 ml. of plasma for up to three days storage at 22° C. It is envisioned, however, that the platelet concentrates in the PVC bags of this invention can be smaller in volume than the presently required minimum of 30 ml. as a consequence of the greatly improved $O_2$ and $CO_2$ transport through the film which results in maintaining the pH at the desired level.

Standard PVC film currently being used for bags in storage of blood or blood components such as platelet concentrates contains about 25 weight percent of the plasticizer di-2-ethylhexyl phthalate (DEHP). It can be shown that about 300 ppm of this plasticizer are present in platelet concentrates stored therein at 22° C. for three days. Under similar conditions only about 20 ppm or less of tri 2-ethylhexyl trimellitate are present in platelet concentrates stored in bags made of PVC containing about 37 percent of this plasticizer.

A better understanding of the invention can be derived from the detailed description which follows.

DETAILED DESCRIPTION OF A PREFERRED EMBODIMENT

Figure 1:
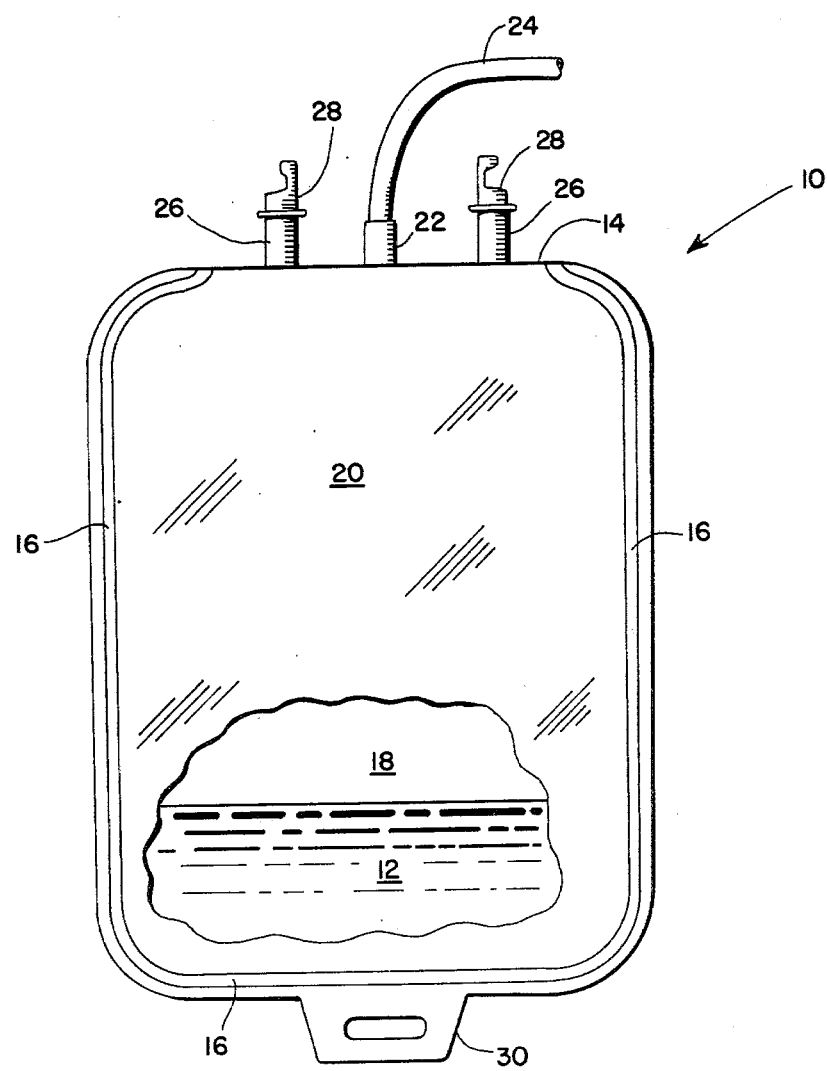

FIG. 1 illustrates a bag 10 partially cut away to show a platelet concentrate 12 stored in the bag. This particular embodiment of the bag is formed from a film sheet folded at the top 14 and heat sealed around three edges 16 to provide the two walls 18 and 20. In a typical blood bag, the internal surface area is at least about 50 in.$^2$. Bag 10 is provided with an inlet 22 which is connected by tubing 24 to a primary bag (not shown) used for collecting whole blood. Bag 10 also has one or more access ports 26 closed by suitable caps 28, and a hanger 30.

The film from which bag 10 is made contains 100 parts by weight of PVC homopolymer (medium molecular weight), 63 parts by weight of tri 2-ethylhexyl trimellitate (TOTM), 5 parts by weight of epoxidized soybean oil, all of which are commercially available. These ingredients can be suitably mixed by a blender and formed into sheets by conventional methods such as by calendaring or by extrusion to a thickness of about 0.015 inch.

Bag 10 which is connected to a primary bag used for collecting whole blood is first steam sterilized under pressure and is then ready for collection of platelets. Blood collected in the primary bag which contains a buffered anti-coagulant such as CPD is first subjected to mild centrifugation to settle the red cells and the upper layer of platelet rich plasma is then expressed into bag 10. By high speed centrifugation, the platelets are collected at the bottom of bag 10 and the platelet poor plasma may then be expressed into another container. Approximately 50 ml. of the plasma remains in bag 10 and the platelets are suspended in this volume of plasma. Prior to use of the platelet concentrate, the bag is gently tumbled or agitated at about room temperature to maintain the platelets in suspension and to aid in the transport of oxygen into the concentrate and the passage of carbon dioxide from the interior of the bag.

Platelet viability was determined at intervals of 1, 2, 3 and 5 days of storage at 22° C. in the PVC bags containing the tri 2-ethylhexyl trimellitate (designated as PVC-TOTM) and in standard PVC bags of the same wall thickness and containing di 2-ethylhexyl phthalate (designated as PVC-DEHP). The method used was essentially tht described by Murphy and Gardner (New Eng. J. Med. 280, pp. 1094–1098, 1969), incorporated herein by reference. The results are expressed in Table 1 as % yield (or recovery) of viable platelets and rate of survival in vivo (T$^{\frac{1}{2}}$).

The pH of suspensions of platelets in the PVC-TOTM bags remained remarkably constant, averaging 7.34, 7.03, 7.30 and 7.26, respectively, for these intervals of storage.

Carbon dioxide transmission rates through the walls of the two types of bags were determined in accordance with ASTMD1434-66 "Gas Transmission Rate of Plastic Film and Sheeting" (Method V). For the PVC-TOTM film, the rate was 4210 ml./meter$^2$/day, and 3110 ml./meter$^2$/day for the PVC-DEHP film. Oxygen transmission rates were 690 and 468 ml./meter$^2$/day, respectively.

These results clearly domonstrate that platelets in the form of concentrates will remain viable for in vivo used even after five days storage at 22° C. when stored in high tensile strength PVC bags which contain about 37 percent tri 2-ethylhexyl trimellitrate as plasticizer. Furthermore, morphology of the platelets remained good (discoid shape) even after five days storage when examined by light microscope. Platelets stored in standard PVC bags containing di 2-ethylhexyl phthalate on the other hand show considerably reduced viability and their morphology is distinctly inferior.

TABLE 1

In Vivo Studies of Platelets Stored at 22° C.

| In Bags | % Recovery | | | |
|---|---|---|---|---|
| | 1-day | 2-days | 3-days | 5-days |
| PVC-TOTM | 52.9$^a$ (6)$^b$ | 59.2 (5) | 51.7 (10) | 50.6 (7) |
| PVC-DEHP | 60 (5) | — | 43 (5) | 37 (5) |

| In Bags | Survival, T$^{\frac{1}{2}}$ (days) | | | |
|---|---|---|---|---|
| | 1-day | 2-days | 3-days | 5-days |
| PVC-TOTM | 4.08 | 4.37 | 3.51 | 3.43 |
| PVC-DEHP | 3.75 | — | 3.45 | 2.6 |

$^a$Average percentages of the number tested
$^b$Number of samples tested in parentheses

What is claimed is:

1. A flexible container having a concentrate of viable platelets stored therein which is suitable for intravenous administration wherein the container comprises plasticized polyvinyl chloride containing about 30 to about 50 percent by weight of tri 2-ethylhexyl trimellitate and about 3–5 percent by weight of a heat stabilization system, the platelets being at an acceptable level of viability for up to about five days storage at about 22° C.

2. The combination of platelet concentrate and container of claim 1 wherein the walls of the container have a thickness of about 0.015 inch.

3. The combination of platelet concentrate and container of claim 1 wherein the amount of tri 2-ethylhexyl trimellitate is about 37 percent.

4. The combination of platelet concentrate and container of claim 1 wherein the heat stabilization system comprises epoxidized soybean oil.

5. The combination of platelet concentrate and container of claim 4 wherein the amount of epoxidized soybean oil is about 3.5 percent.

* * * * *

UNITED STATES PATENT AND TRADEMARK OFFICE
Certificate

Patent No. 4,280,497                                         Patented July 28, 1981

Willis L. Warner and Edward J. Nelson

Application having been made by Willis L. Warner and Edward J. Nelson, the inventors named in the patent above-identified, and Miles Laboratories, Inc., the assignee, for the issuance of a certificate under the provisions of Title 35, Section 256, of the United States Code, adding the name of Raleigh A. Carmen as a joint inventor, and a showing and proof of facts satisfying the requirements of the said section having been submitted, it is this 28th day of Feb. 1984, certified that the name of the said Raleigh A. Carmen is hereby added to the said patent as a joint inventor with the said Willis L. Warner and Edward J. Nelson.

Fred W. Sherling,
*Associate Solicitor.*